US010897999B2

United States Patent
Jakobsen et al.

(10) Patent No.: US 10,897,999 B2
(45) Date of Patent: Jan. 26, 2021

(54) MOTORIZED ADJUSTABLE BACK SUPPORT FOR RECLINER

(71) Applicant: IMG Group AS, Sykkylven (NO)

(72) Inventors: Lars Inge Jakobsen, Ørskog (NO); Rune Jonsen, Valderøya (NO)

(73) Assignee: IMG GROUP AS, Sykkylven (NO)

( * ) Notice: Subject to any disclaimer, the term of this patent is extended or adjusted under 35 U.S.C. 154(b) by 126 days.

(21) Appl. No.: 16/346,665

(22) PCT Filed: Nov. 1, 2017

(86) PCT No.: PCT/NO2017/000028
§ 371 (c)(1),
(2) Date: May 1, 2019

(87) PCT Pub. No.: WO2018/084714
PCT Pub. Date: May 11, 2018

(65) Prior Publication Data
US 2019/0274434 A1    Sep. 12, 2019

(30) Foreign Application Priority Data
Nov. 2, 2016  (NO) .................................. 20161732

(51) Int. Cl.
*A47C 7/46*    (2006.01)
*B60N 2/66*    (2006.01)

(52) U.S. Cl.
CPC ............ *A47C 7/462* (2013.01); *B60N 2/6673* (2015.04)

(58) Field of Classification Search
CPC ..... A47C 7/462; B60N 2/6673; B60N 2/7029
See application file for complete search history.

(56) References Cited

U.S. PATENT DOCUMENTS

| 3,807,794 A |   | 4/1974 | Beyer |
| 4,182,533 A | * | 1/1980 | Arndt .................... A47C 7/462 |
|             |   |        | 297/284.4 |

(Continued)

FOREIGN PATENT DOCUMENTS

| DE |     3204540 A1 | * |  8/1983 | ........... B60N 2/6673 |
| DE | 102017109367 A1 | * | 11/2018 | ............. B60N 2/666 |

(Continued)

OTHER PUBLICATIONS

International Search Report (PCT/ISA/210) issued in PCT/NO2017/000028, dated Jan. 2, 2018.

(Continued)

*Primary Examiner* — Timothy J Brindley
(74) *Attorney, Agent, or Firm* — Birch, Stewart, Kolasch & Birch, LLP

(57) ABSTRACT

The invention relates to motorized adjustable back support for recliner chair comprising a back frame and means for transforming the power of a motor to a rotational movement of a horizontal rotation bar which is rotationally connected to the frame. The back support further comprises two adjustment arms each fixed on each side of the rotation bar close to the respective sides of the frame wherein the adjustments arms are parallel and have a flexible elongate unit stretching between their respective outer ends, and wherein the adjustment arms can move from a neutral to an extended position, corresponding to a rotation of the rotation bar. Furthermore the flexible elongate unit is rotationally connected to the end of each adjustment arm and the backrest comprises an incision into which the flexible elongate unit is positioned, wherein the incision starts near a rear bottom corner of the backrest over the full width of the backrest and extends upward and into the backrest in such a way that the flexible elongate unit is positioned where the (Continued)

lower back of a user is expected to be, wherein the incision is lined with a wear resistant, low friction material.

8 Claims, 5 Drawing Sheets

(56) References Cited

U.S. PATENT DOCUMENTS

| | | | | |
|---|---|---|---|---|
| 4,722,569 A | * | 2/1988 | Morgenstern | A47C 7/462 297/230.14 |
| 4,950,032 A | * | 8/1990 | Nagasaka | A47C 7/462 297/284.4 |
| 5,553,919 A | | 9/1996 | Dennis | |
| 6,059,362 A | * | 5/2000 | Lin | A47C 7/425 297/284.4 |
| 9,326,608 B1 | | 5/2016 | Hoy et al. | |
| 2003/0006636 A1 | | 1/2003 | Ligon, Sr. et al. | |
| 2005/0275263 A1 | | 12/2005 | Norman et al. | |
| 2008/0296958 A1 | * | 12/2008 | Peterson | A47C 7/462 297/452.18 |
| 2017/0215590 A1 | * | 8/2017 | Sigmon | A47C 7/462 |
| 2020/0055430 A1 | * | 2/2020 | Tuman, II | B60N 2/666 |

FOREIGN PATENT DOCUMENTS

| | | | | |
|---|---|---|---|---|
| GB | 762304 A | * | 11/1956 | A47C 7/462 |
| WO | WO-8500736 A1 | * | 2/1985 | A47C 7/462 |
| WO | WO 86/02243 A1 | | 4/1986 | |
| WO | WO 2009/061204 A1 | | 5/2009 | |
| WO | WO 2015/106338 A1 | | 7/2015 | |
| WO | WO 2016/052581 A1 | | 4/2016 | |
| WO | WO-2016059876 A1 | * | 4/2016 | B60N 2/66 |

OTHER PUBLICATIONS

Written Opinion (PCT/ISA/237) issued in PCT/NO2017/000028, dated Jan. 2, 2018.

* cited by examiner

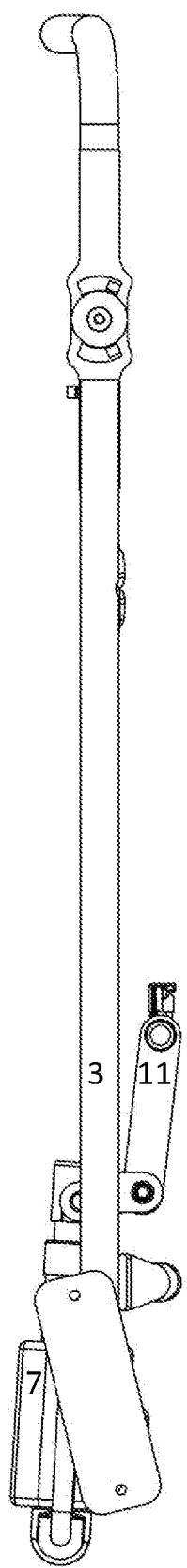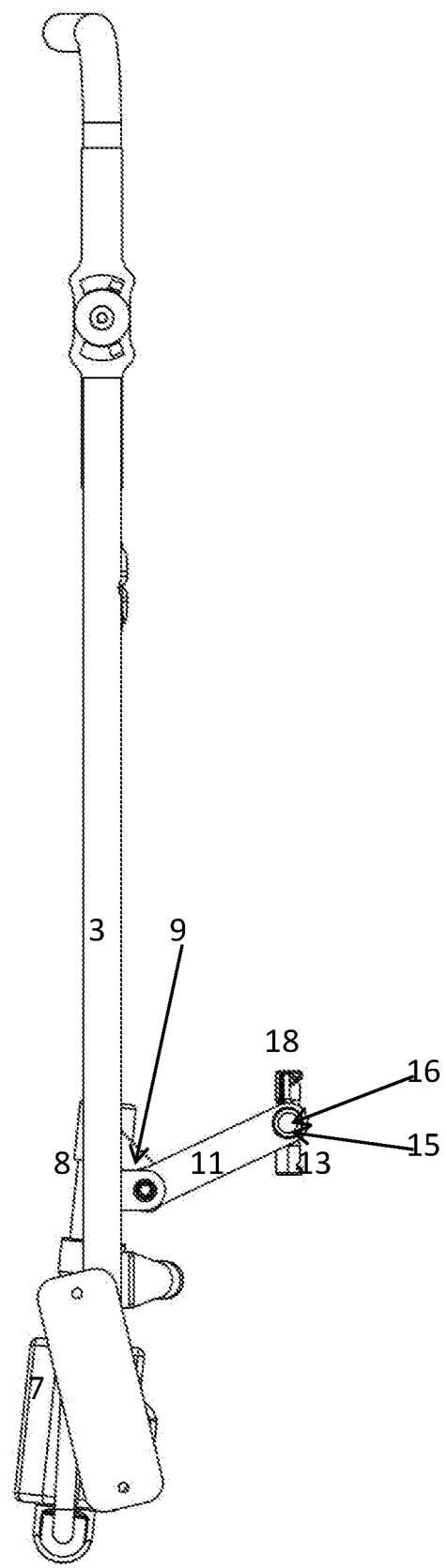
FIG. 3A
FIG. 3B

MOTORIZED ADJUSTABLE BACK SUPPORT FOR RECLINER

FIELD OF INVENTION

The present invention relates to furniture in general and to a motorized adjustable back support for a reclining chair in particular.

BACKGROUND

In the following we will describe a so called "recliner", a chair or sofa which can be moved between a sitting position and a reclining position. In the reclining position the user has a semi lying position, and an in-build, foldable foot rest projecting horizontally as an elongation of the seat. To further enhance the comfort an adjustable backrest and headrest is provided.

The recliner has become a popular furniture in the average home in the industrialized world and several different versions have emerged. The 'stressless' of Ekornes is well known as a category of chairs and in the US a bulkier and bigger version is popular. The applicant aims at constructing a slim and light weight recliner with the same comfort as the bigger alternatives, and at the same time provide mechanisms that will last the full lifetime of the furniture. There is also a growing demand for motorized remote control of head rest, foot rest and back support. This put restrictions on the framework of the chair and how the motorized adjustment mechanisms are built. The present application solves some of the problems related to a motorized adjustment mechanism for a back support and will normally be positioned in the back frame of a recliner together with a mechanism for a motorized adjustable headrest. The presence of two mechanisms in the back frame also give some restrictions to the construction. The mechanism for a motorized adjustable headrest is applied for in a parallel application.

The car industry has a number of light weight, slim constructions with motorized adjustable back supports using wires or pumps. One example of such a system is U.S. Pat. No. 5,553,919. The life expectancy of such mechanisms is however considerably shorter than the lifetime of a recliner; the wires tend to break in their fastenings and the pumps need maintenance or start leaking. This is why movement transfer through rigid structures is preferable and why the problem of slim structures should be solved with this in mind.

SUMMARY OF THE INVENTION

The invention relates to motorized adjustable back support for recliner chair comprising a back frame with two side parts and an upper and lower part, and a backrest covering the frame and being shaped to support a human back.

The adjustable back support further comprises a motor, means for transforming the power of the motor to a rotational movement of a horizontal rotation bar rotationally connected to the frame, two adjustment arms each fixed on each side of the rotation bar close to the respective side parts of the frame wherein the adjustments arms have a flexible elongate unit stretching between their respective outer ends, and wherein the adjustment arms can move flexible elongate unit from a neutral to an extended position, corresponding to a rotation of the rotation bar.

Furthermore the flexible elongate unit is rotably connected to the end of each adjustment arm and the backrest comprises means for transferring the movement of the flexible elongate unit to the lower back region of the backrest. The said means can be an incision, which starts near a rear bottom corner of the backrest over the full width of the backrest and extends upward and into the backrest in such a way that the flexible elongate unit can be positioned where the lower back of a user is expected to be, wherein the incision is lined with a wear resistant, low friction material, or said means can be provided by molding the flexible elongate unit into the lower back region of the backrest in one or more steps.

BRIEF DESCRIPTION OF THE DRAWINGS

To improve the understanding of the invention a number of figures showing actual embodiments is provided. Like numerals in different figures are linked to the same part.

FIGS. 3A and B shows the back frame with the back support in a neutral and extended position.

DETAILED DESCRIPTION

In the following the terms up, down, left, right forward, backward will be defined by a person sitting in the chair in an upright position.

Figure 1:
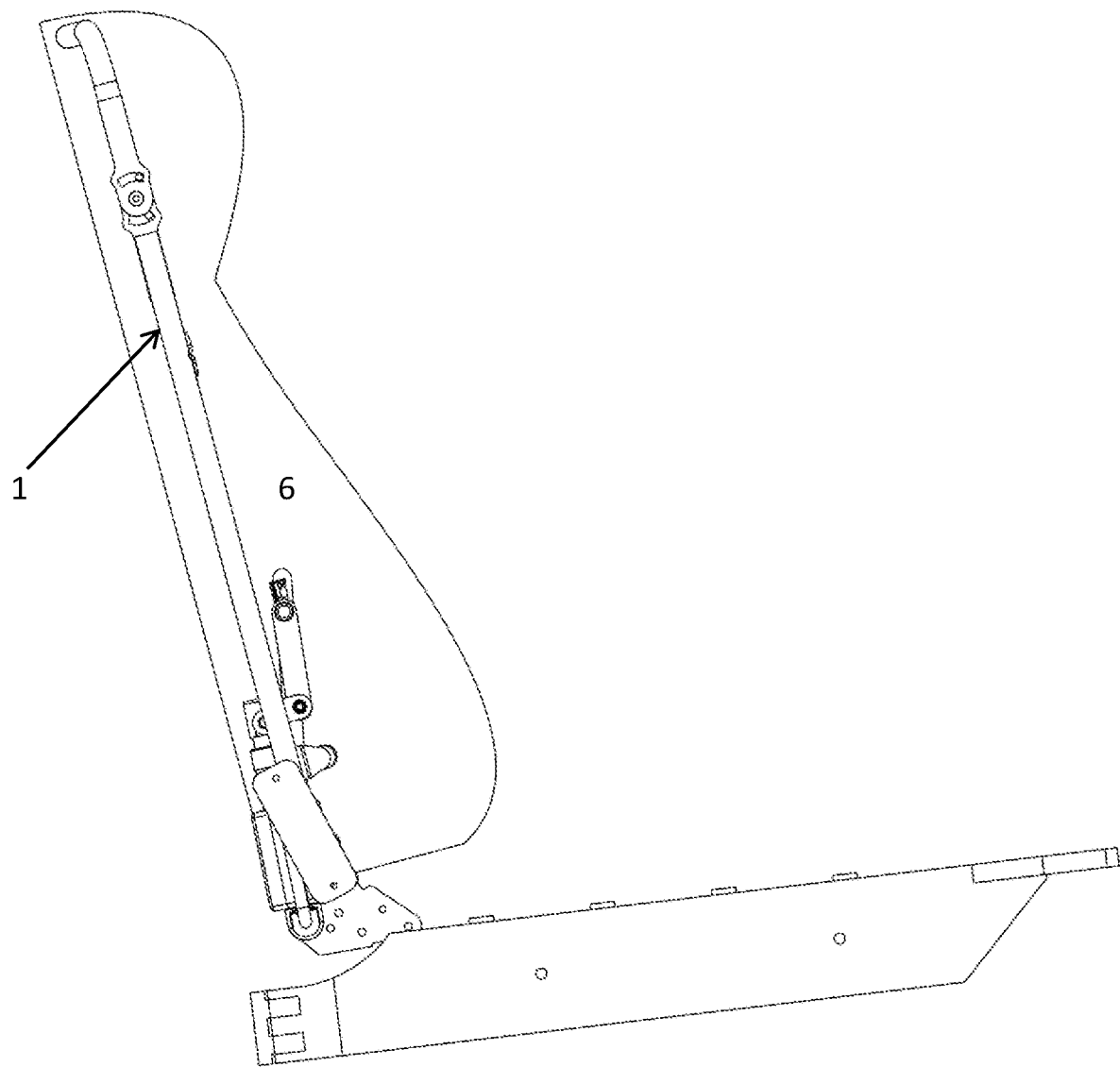
FIG. 1 shows a complete frame of a recliner chair.

FIG. 1 shows an entire frame of a recliner chair with a back frame 1 and the contour of a backrest 6 covering the back frame 1 and shaped to support a human back and head.

In order to achieve a light weight slim and cheap frame, the frame is preferably made of a tubular metal such as steel, but other materials like wood, fibers or a plastic might be used. In this description we will not describe the seat and footrest and related mechanisms, but focus on the back frame 1, Furthermore we will not describe the remote control system needed to operate the adjustable back support, because different versions of remote control systems is readily available.

Figure 2:
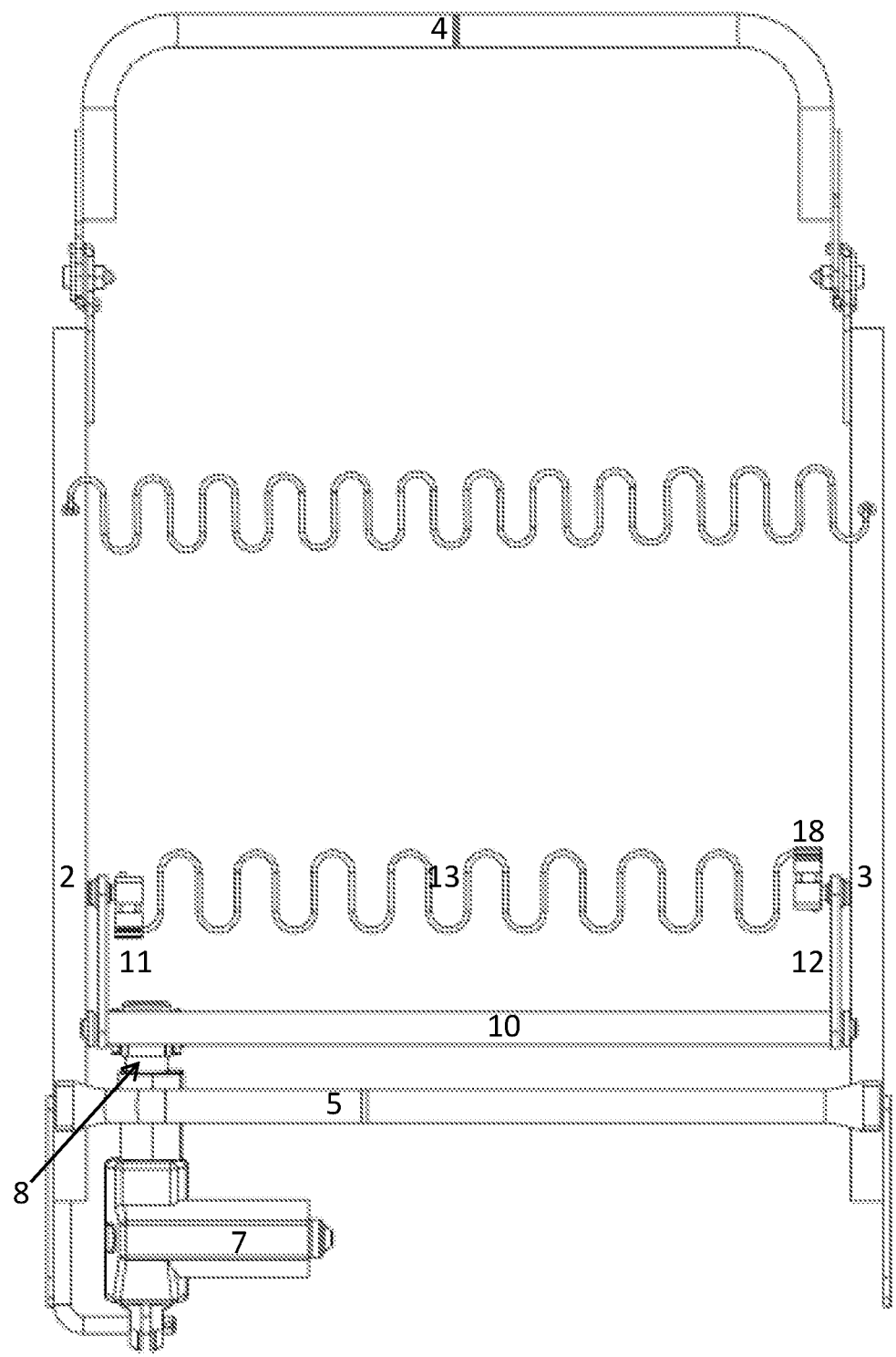
FIG. 2 shows a front view of the back frame with one motor for adjusting the back support.
Figure 4:
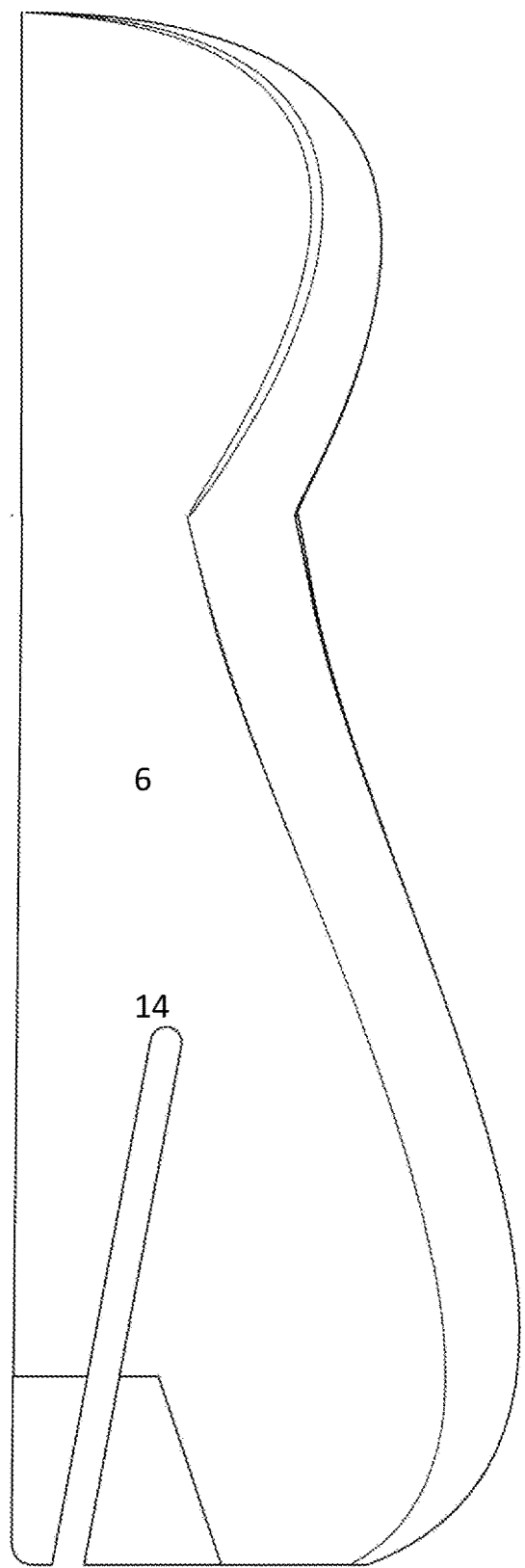
FIG. 4 shows a backrest with an incision.

FIG. 2 shows the back frame 1 seen from the front. The back frame 1 comprises two side parts 2, 3 and an upper and lower part 4, 5. A motor is mounted on the lower part of the back frame 1, more specifically on a hook extending from the side part 2 of the back frame 1. An extendable rod 8 is connected to the motor, and acts on a pivot arm 9, seen in FIG. 3B, which in turn is fixedly connected to a horizontal rotation bar 10. The horizontal rotation bar 10 is rotationally connected to the frame. Either to both side parts 2, 3 of the frame or to the lower part 5. Two parallel adjustment arms 11, 12 are each fixed on each side of the rotation bar 10 close to the respective side parts 2, 3 of the frame 1.

The motor could be mounted elsewhere provided the existence of suitable means for transforming the power of the motor to a rotational movement of the horizontal rotation bar 10. The above mentioned means could be hydraulic, wires, pneumatic or rigid structures. The motor is preferably an electrical motor with power supplied by a battery or the local grid.

The adjustments arms 11 have a flexible elongate unit 13 stretching between their respective outer ends. The adjustment arms are able to move the flexible elongate unit 13 from a neutral to an extended position as shown in FIGS. 3A and B, corresponding to a rotation of the rotation bar 10. In the embodiment shown in FIG. 2 the flexible elongate unit is a serpentine spring 13 which is rotationally mounted in the outer end of each respective adjustment arm 11, 12 by means of a clip 18.

The clip (described later) is acting together with a bolt 15 inserted through a hole in the outer end of the adjustment arm, and is able to hold a serpentine spring 13 in a fixed rotatable position relative to the adjustment arm. The serpentine spring is positioned inside an incision 14 in the backrest which starts near a rear bottom corner of the backrest 6 over at least a partial width of the backrest accommodating the adjustment arms 11, 12 and serpentine spring. The incision 14 then extends upward and into the backrest 6 in such a way that the serpentine spring 13 is positioned where the lower back of a user is expected to be—the lower back region of the backrest 6. The incision 14 is lined with a wear resistant, low friction material. Together with the rotational properties of the serpentine spring 13, the friction of the spring against the inside of the incision 14 is thus brought down to an acceptable level.

The serpentine spring is connected to the respective ends of the adjustment arms by means of a bolt going through a hole at the end of the adjustment arms, wherein the bolt is inserted through the hole from the outside relative to the center of the recliner and have a hole through which the serpentine spring is inserted, thus holding the serpentine spring and bolts in tension between the adjustable arms, and wherein the serpentine spring is stabilized against movement in the hole of the bolt by means of a clip.

In one embodiment the backrest comprises two parts sandwiched together and then fastened to each other. In such an embodiment the incision is a part of the backrest where the two parts are not fastened together.

The clip is meant for a configuration wherein the rotational axis of the serpentine spring 13 goes through the longitudinal centerline of the serpentine spring and the serpentine spring is inserted through a hole 17 in the bolt 15 such that the centerline of the serpentine spring, the centerline of the bolt 15 and the rotational axis coincide.

Figure 5:
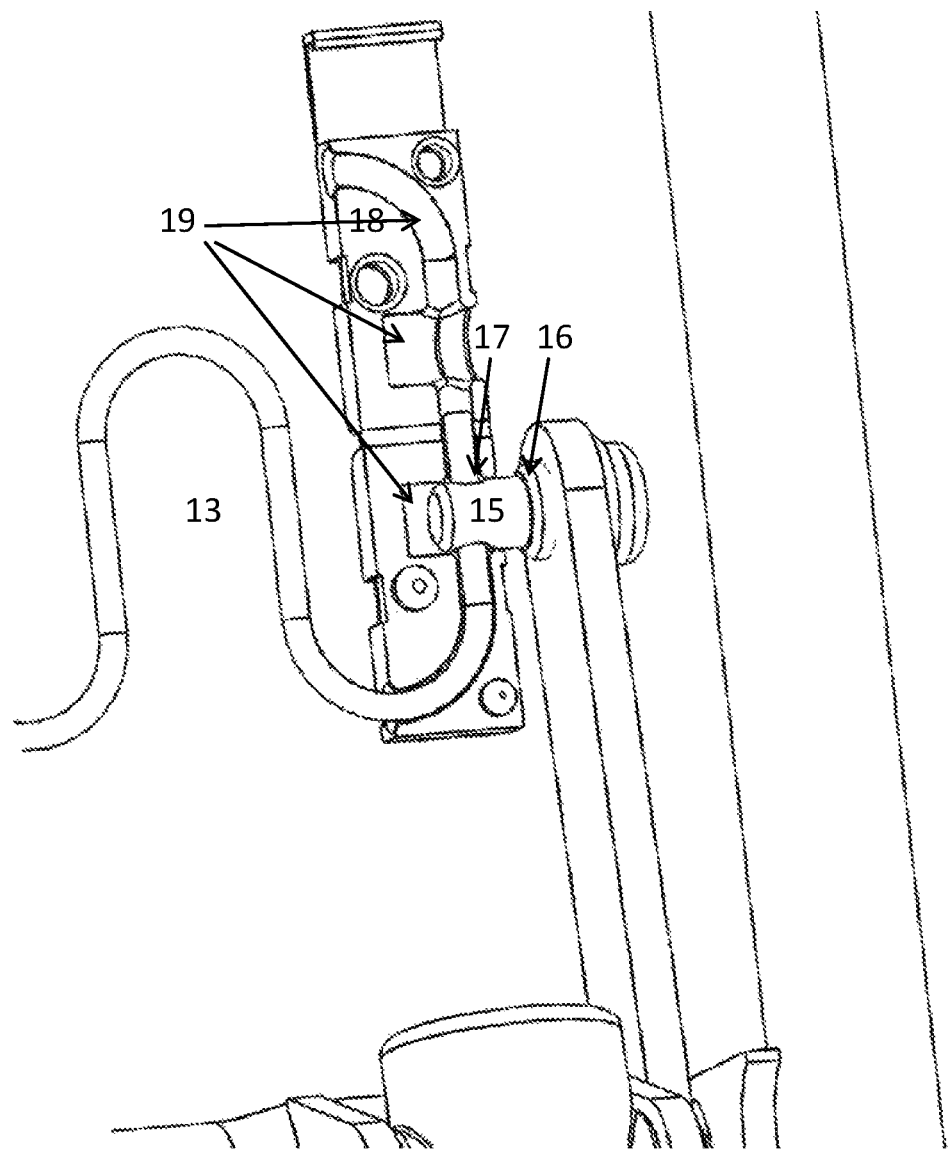
FIG. 5 shows a clip for fixing a serpentine spring.

The clip 18 comprises an upper section comprising a groove 19 corresponding to the imprint of the bolt 15 and at least a part of a turn on at least one side of the centerline of the serpentine spring 13. It further comprises a lower section comprising a similar mirroring groove, and means for connecting the two sections in a locking grip. As can be understood from looking at FIG. 5 the serpentine spring and the clip holding it will rotate around an axis going through the centerline of the hole 17 in the bolt 15. In order to allow this rotation when the serpentine spring 13 flexes back and forth at a right angle to the backrest, the imprint of the bolt in the groove 19 has an additional depth.

In another embodiment the flexible elongate unit is molded into the lower back region of the backrest in one or more steps and flexible elongate unit 13 is otherwise fastened to the ends of the adjustment arms in the same manner as described above. The backrest 6 must, in this embodiment, be sufficiently flexible to handle a component of the movements of the adjustment arms 11, 12 being parallel to the back frame 1. The molding can be done in different ways and in several steps to adjust the freedom to move of flexible elongate unit 13.

The backrest 6 can be made of different materials or combination of materials. The material must be soft enough to provide a comfortable seating and be able to move along with the movements of flexible elongate unit 13. And the material must be hard enough to spread the forces from the movement of flexible elongate unit 13 to a sufficiently large area of the backrest 6. One such material is polyurethane foam. It could also be latex foam, rubber foam, felt, wool or fibers.

To further reduce the wear of the adjustable back support the cover of the backrest 6 does not cover the incision 14, but is wrapped around two separate parts divided by the incision 14. This reduces the resistive forces acting on flexible elongate unit 13 when the back rest is moved back and forth by a rotational movement of the adjustment arms 11, 12 and thus also reduces the wear on the material in the incision 14 and the effect needed from the motor.

The invention claimed is:

1. A motorized adjustable back support for a recliner chair comprising:
    a back frame with two side parts and an upper and lower part;
    a backrest covering the frame and shaped to support a human back;
    a motor;
    means for transforming the power of the motor to a rotational movement of a horizontal rotation bar rotationally connected to the frame; and
    two adjustment arms, each of said two adjustment arms being fixed on each side of the rotation bar close to the respective side parts of the frame, wherein the adjustments arms have a flexible elongate unit stretching between respective outer ends thereof, and wherein the adjustment arms can move the flexible elongate unit from a neutral to an extended position, corresponding to a rotation of the rotation bar,
    wherein the flexible elongate unit is rotationally connected to the end of each adjustment arm,
    wherein the backrest comprises an incision, which starts near a rear bottom corner of the backrest over at least a partial width of the backrest accommodating the adjustment arms and the incision then extends upward into the backrest in such a way that the flexible elongate unit can be positioned where the lower back of a user is expected to be, and
    wherein the incision is lined with a wear resistant, low friction material.

2. The back support according to claim 1, wherein the back frame is made of one of: metal tubulars, metal profiles, wood, a plastic product and fibers.

3. The back support according to claim 1, wherein the cover of the backrest is wrapped around two separate parts divided by the incision.

4. The back support according to claim 1, wherein the means for transforming the power of the motor to a rotational movement of a horizontal rotation bar is an extendable rod connected to the motor, which is mounted on the lower part of the back frame, wherein the extendable rod acts on a pivot arm fixedly connected to the rotation bar.

5. The back support according to claim 1, wherein the backrest is made out of one or a combination of: polyurethane foam, latex foam, rubber foam, felt, wool or fibers.

6. The back support according to claim 1, wherein the flexible elongate unit is a serpentine spring.

7. The back support according to claim 6, wherein the serpentine spring is connected to the respective ends of the adjustment arms by means of a bolt going through a hole at the end of the adjustment arms, wherein the bolt is inserted through the hole from the outside relative to the center of the chair and has a hole through which the serpentine spring is inserted, thus holding the serpentine spring and bolts in tension between the adjustable arms, and wherein the serpentine spring is stabilized against movement in the hole of the bolt by a clip for holding the serpentine spring in a fixed rotatable position.

8. The back support according to claim 7, wherein the clip holds the serpentine spring in a fixed rotatable position with a rotational axis going through the longitudinal centerline of the serpentine spring, wherein the serpentine spring is inserted through a hole in the bolt such that the centerline of the serpentine spring, the centerline of the bolt and the rotational axis coincide, wherein the clip comprises:
- an upper section comprising a groove corresponding to the imprint of the bolt and at least a part of a turn on at least one side of the centerline of the serpentine spring;
- a lower section comprising a similar mirroring groove; and
- means for connecting the two sections in a locking grip, wherein the imprint of the bolt in the groove has an additional depth to allow the serpentine spring to rotate in the hole in the bolt.

* * * * *